(12) United States Patent
Jintaseranee et al.

(10) Patent No.: US 9,143,428 B1
(45) Date of Patent: Sep. 22, 2015

(54) KEEP-ALIVE MESSAGE INTEGRATION OVER A WIRELESS COMMUNICATION NETWORK

(75) Inventors: Kosol Jintaseranee, San Jose, CA (US); Travis Edward Dawson, San Francisco, CA (US)

(73) Assignee: Sprint Communications Company L.P., Overland Park, KS (US)

( * ) Notice: Subject to any disclaimer, the term of this patent is extended or adjusted under 35 U.S.C. 154(b) by 810 days.

(21) Appl. No.: 12/728,321

(22) Filed: Mar. 22, 2010

(51) Int. Cl.
*G06F 15/16* (2006.01)
*H04L 12/751* (2013.01)

(52) U.S. Cl.
CPC .............. *H04L 45/02* (2013.01); *H04L 45/026* (2013.01)

(58) Field of Classification Search
None
See application file for complete search history.

(56) References Cited

U.S. PATENT DOCUMENTS

| | | | |
|---|---|---|---|
| 6,507,562 B1 * | 1/2003 | Kadansky et al. | 370/216 |
| 8,156,209 B1 * | 4/2012 | Phadnis et al. | 709/223 |
| 2007/0294426 A1 * | 12/2007 | Huang et al. | 709/234 |
| 2008/0154913 A1 * | 6/2008 | Kohonen | 707/10 |
| 2008/0225865 A1 | 9/2008 | Herzog | |
| 2009/0201857 A1 | 8/2009 | Daudin et al. | |
| 2010/0191968 A1 * | 7/2010 | Patil et al. | 713/170 |
| 2011/0051932 A1 * | 3/2011 | Hoover et al. | 380/270 |

* cited by examiner

*Primary Examiner* — Brian P. Whipple
*Assistant Examiner* — Keyvan Emdadi

(57) ABSTRACT

A wireless communication device that executes applications receives keep-alive messages including keep-alive data from the applications. The device processes the keep-alive data to select keep-alive messages for keep-alive message integration. The wireless communication device transfers integrated keep-alive data for the selected messages during a transfer window. A wireless communication system receives and processes the integrated keep-alive data to transfer individual keep-alive messages having the keep-alive data.

13 Claims, 7 Drawing Sheets

KEEP-ALIVE MESSAGE INTEGRATION OVER A WIRELESS COMMUNICATION NETWORK

TECHNICAL BACKGROUND

The typical wireless communication device executes various software applications that obtain services for the user from remote servers. Some of these applications periodically send keep-alive messages to the remote servers to maintain their services. Examples of services that utilize keep-alive messaging include email, social networking, and video streaming—among others. The remote servers shut down the service for the user if they do not receive the expected keep-alive messages.

In some cases, multiple applications concurrently transfer several periodic keep-alive messages. If the timing of these numerous keep-alive messages is distributed, then the wireless communication device may continually transfer keep-alive messages, which drains the battery and leaves less time to handle other communication tasks. The numerous keep-alive messages also consume valuable bandwidth in the wireless communication network.

OVERVIEW

A wireless communication device executes applications and receives keep-alive messages including keep-alive data from the applications. The device processes the keep-alive data to select keep-alive messages for keep-alive message integration. The wireless communication device transfers integrated keep-alive data for the selected keep-alive messages during a keep-alive data transfer window. A wireless communication system receives and processes the integrated keep-alive data to transfer individual keep-alive messages that have the keep-alive data.

DETAILED DESCRIPTION

Figure 1:
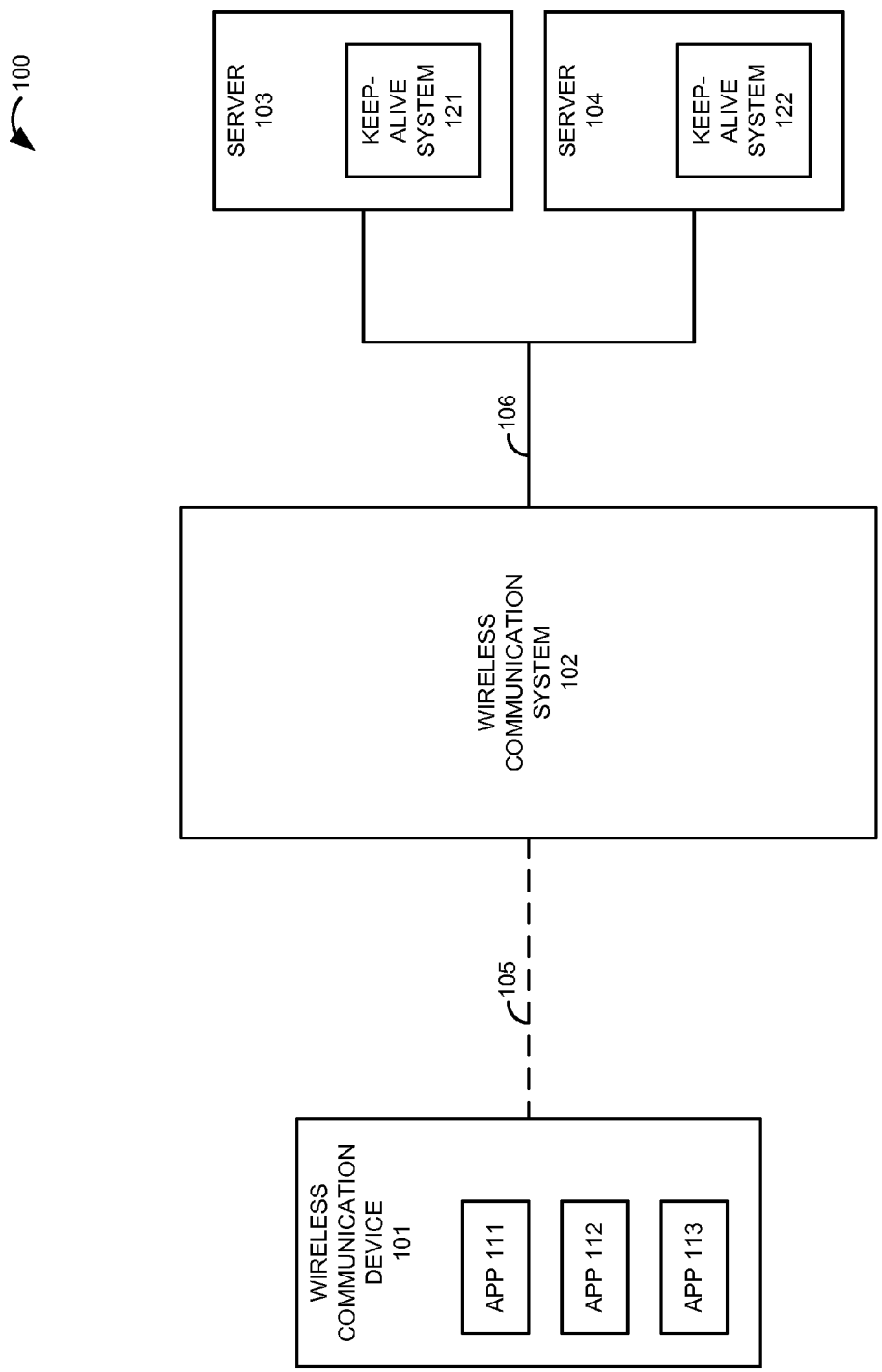
FIG. 1 illustrates a communication system that integrates keep-alive messaging.

FIG. 1 illustrates communication system 100. Communication system 100 comprises wireless communication device 101, wireless communication system 102, and servers 103-104. Wireless communication device 101 includes applications 111-113. Servers 103-104 include respective keep-alive systems 121-122. Wireless communication device 101 and wireless communication system 102 communicate over wireless communication link 105. Wireless communication system 102 and servers 103-104 communicate over network communication links 106.

Wireless communication device 101 comprises a computer, electronic game, media player, telephone, internet appliance, wireless transceiver, or some other electronic apparatus capable of wireless communication. Applications 111-113 comprise software modules that are executed by wireless communication device 101. Working together, applications 111-113 and servers 103-104 provide email, gaming, social networking, media transfer, internet browsing, or some other service to the user. Applications 111-113 also generate keep-alive messaging for transfer to keep-alive systems 121-122 in servers 103-104.

When the user opens application 111, wireless communication device 101 initiates the corresponding service from server 103. To maintain the service, application 111 provides keep-alive messages at regular intervals to keep-alive system 121 in server 103. If the user suddenly closes application 111 or if wireless communication device 101 loses wireless connectivity, then the keep-alive messages stop. After an interval without receiving a keep-alive message, keep-alive system 121 closes the service for the user. Applications 112-113 and server 104 interact to provide services that require keep-alive messaging in a similar manner.

Wireless communication device 101 detects and integrates these keep-alive messages over wireless communication link 105. For selected keep-alive messages, wireless communication device 101 delays the transfer of their keep-alive data until a keep-alive transfer window. Advantageously, the common transfer window mitigates the need for wireless communication device 101 to remain communicatively active on a continuous basis.

In some examples, wireless communication device 101 integrates multiple individual keep-alive messages into a single composite keep-alive message, and wireless communication system 102 processes the single composite keep-alive message to transfer the individual keep-alive messages to servers 103-104. In some examples, wireless communication device 101 places keep-alive codes in the composite keep-alive message, where the codes represent the individual blocks of keep-alive data.

Advantageously, the keep-alive messaging described herein simplifies integration and reduces messaging bandwidth. The resulting reduction in wireless communications for keep-alive messaging increases the idle time of the wireless communication device 101. In turn, the increased idle time increases the life of the battery.

Figure 2:
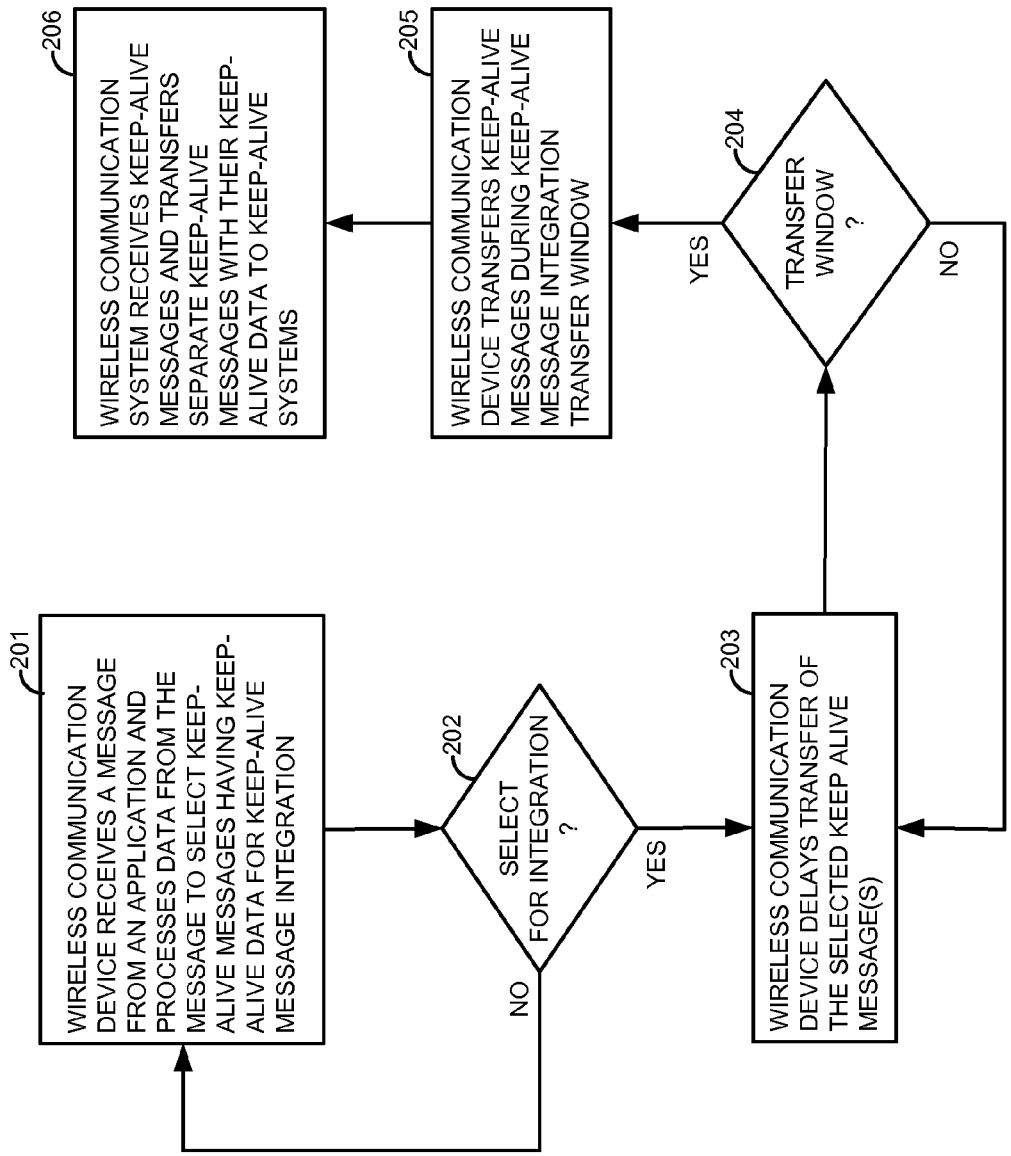
FIG. 2 illustrates the operation of the communication system to integrate keep-alive messaging.

FIG. 2 illustrates the operation of communication system 100 to integrate keep-alive messaging. Wireless communication device 101 receives a message from an application for wireless transfer and processes data from the message to select keep-alive messages having keep-alive data for keep-alive message integration (201). To select keep-alive messages for integration, wireless communication device 101 may perform pattern matching, deep packet inspection, address analysis, or some other technique.

For example, wireless communication device 101 may store a set of keep-alive signatures. The keep-alive signatures are mathematically derived from the keep-alive messages that should be selected for integration. Wireless communication device 101 processes new messages to mathematically derive their message signatures, and then device 101 compares the message signatures with the set of keep-alive signatures to identify matches for integration. In some cases, wireless communication system 102 transfers the set of keep-alive signatures and corresponding keep-alive codes to wireless communication device 101.

If wireless communication device selects a message for keep-alive integration (202), then device 101 delays the wireless transfer of the keep-alive message until a keep-alive integration window opens (203). During the transfer window (204), wireless communication device 101 wirelessly transfers the delayed keep-alive messages (205). Wireless communication system 102 wirelessly receives the keep-alive messages and forwards them to keep-alive systems 121-122 in servers 103-104 (206). Advantageously, the keep-alive transfer window mitigates the need for wireless communication device 101 to remain communicatively active on a continuous basis to transfer keep-alive messages at the various uncoordinated times.

Figure 3:
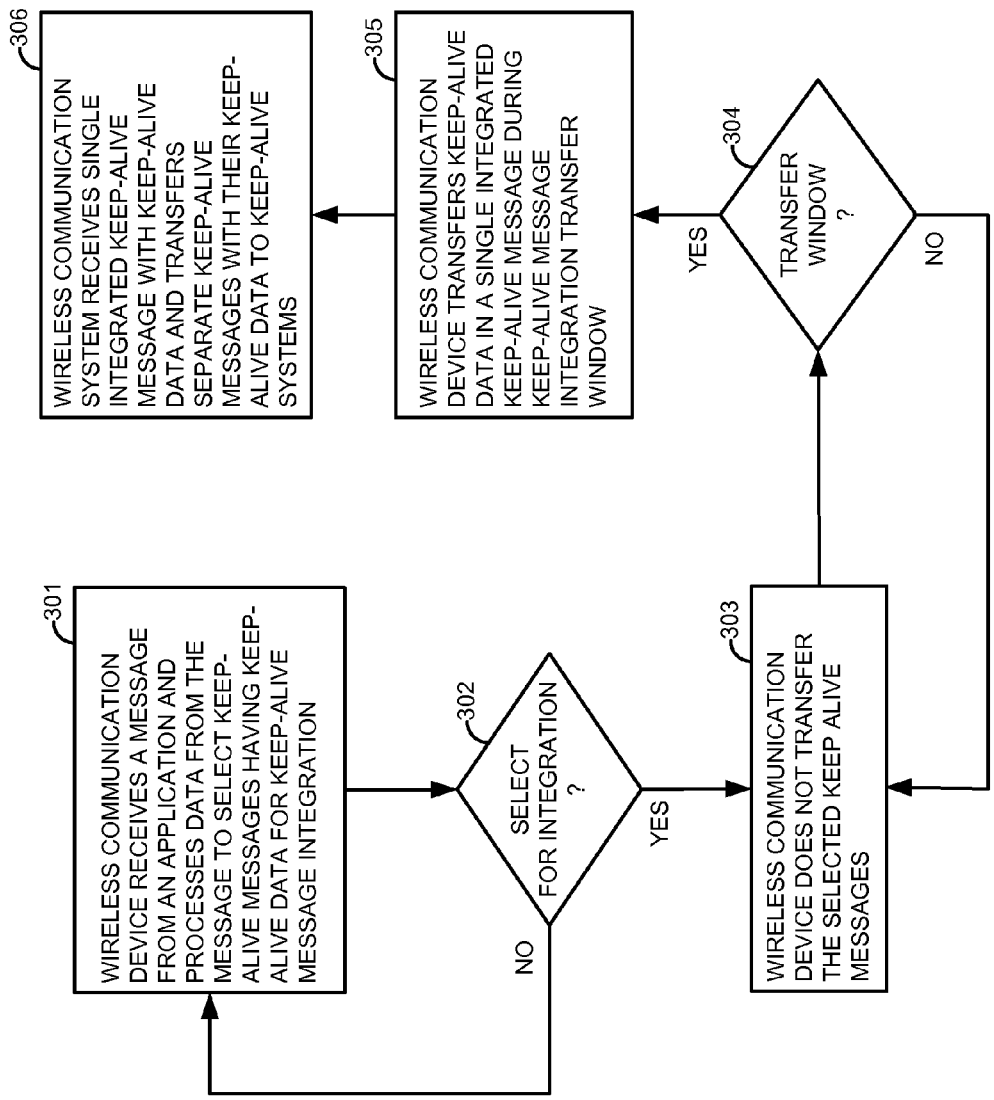
FIG. 3 illustrates the operation of the communication system to integrate keep-alive messaging.

FIG. 3 also illustrates the operation of communication system 100 to integrate keep-alive messaging. Wireless communication device 101 receives a message from an application for wireless transfer and processes data from the message to select keep-alive messages having keep-alive data for keep-alive message integration (301). To select keep-alive messages for integration, wireless communication device 101 may perform pattern matching, deep packet inspection, address analysis, or some other technique.

If wireless communication device selects a message for keep-alive integration (302), then device 101 does not transfer the keep-alive message (303) and awaits the keep-alive integration window (304). During the transfer window (304), wireless communication device 101 wirelessly transfers the keep-alive data from the held keep-alive messages in a single integrated keep-alive message (305). Wireless communication system 102 wirelessly receives the integrated keep-alive message and processes the keep-alive data from the integrated message to transfer individual keep-alive messages to keep-alive systems 121-122 in servers 103-104 (306).

For example, wireless communication device 101 may remove a block of keep-alive data from each of the individual keep-alive messages received from applications 111-113 and place these blocks of keep-alive data in the integrated message. Wireless communication system 102 would then convert each block of keep-alive data into an individual keep-alive message for transfer to servers 103-104. Advantageously, the composite keep-alive message simplifies integration and reduces messaging bandwidth, and in turn, increases the life of the battery.

Figure 4:
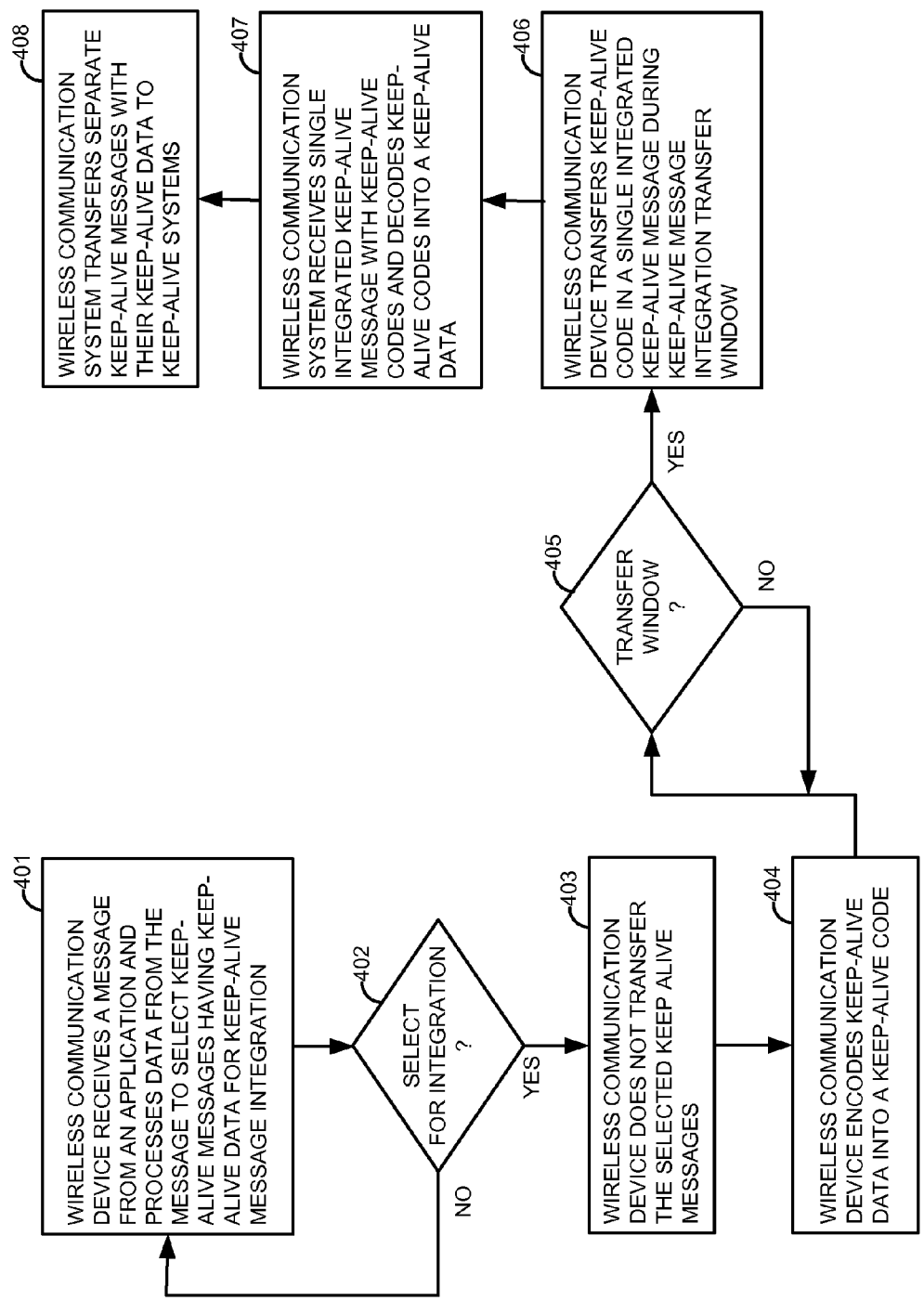
FIG. 4 illustrates the operation of the communication system to integrate keep-alive messaging.

FIG. 4 also illustrates the operation of communication system 100 to integrate keep-alive messaging. Wireless communication device 101 receives a message from an application for wireless transfer and processes data from the message to select keep-alive messages having keep-alive data for keep-alive message integration (401). To select keep-alive messages for integration, wireless communication device 101 may perform pattern matching, deep packet inspection, address analysis, or some other technique.

If wireless communication device 101 selects a message for keep-alive integration (402), then device 101 does not transfer the keep-alive message (403). Wireless communication device 101 encodes the keep-alive data from the message into a keep-alive code and awaits the transfer window (404). During the transfer window (405), wireless communication device 101 wirelessly transfers the keep-alive codes in a single integrated keep-alive message (406). Wireless communication system 102 wirelessly receives the integrated keep-alive message and decodes the keep-alive codes from the integrated message back into the keep-alive data (407). Wireless communication system 102 then processes the keep-alive data to transfer individual keep-alive messages to keep-alive systems 121-122 in servers 103-104 (408).

For example, wireless communication device 101 may detect that a given keep alive message is for a specific email service for a specific email address of the user. The resulting code would correlate or represent the specific email service and the specific email address of the user. Wireless communication system 102 would then convert the code into a keep-alive message for the specific email service and the specific email address of the user. Advantageously, the codes significantly reduce messaging bandwidth and increase the life of the battery.

In some cases, wireless communication device 101 may initially send a reference copy of a keep-alive message and a corresponding code to wireless communication system 102 to use as a message template. When wireless communication system 102 subsequently receives the code, it uses the message template to generate the individual keep-alive message.

In the above examples, wireless communication device 101 "delays" the transfer keep-alive message data. In this context, the term "delay" does not require that this exact same keep-alive message data is eventually transferred. The term "delay" includes situations where wireless communication device 101 eventually sends codes representing the keep-alive message data and the codes are converted back into at least some of the data.

FIGS. 2-4 illustrate various examples of keep-alive message integration. These examples may performed independently of one another. Moreover, aspects of the examples could be also combined in various ways.

In addition, the transfer of integrated keep-alive messaging can take advantage of opportunistic events and device status. For example, the integrated keep-alive messages could be sent when transmitting or receiving a voice call or text message. The control channels associated with these events could be used to conserve battery life and radio resources. Likewise, the transfer of the integrated keep-alive messages could be timed to occur before a device dormancy timer expires. The transfer of integrated keep-alive messages while the device is still active (and not dormant) avoids the need to wake-up from the dormant state just to transfer a keep-alive message. Thus, the device remains dormant longer and battery life is extended.

Figure 5:
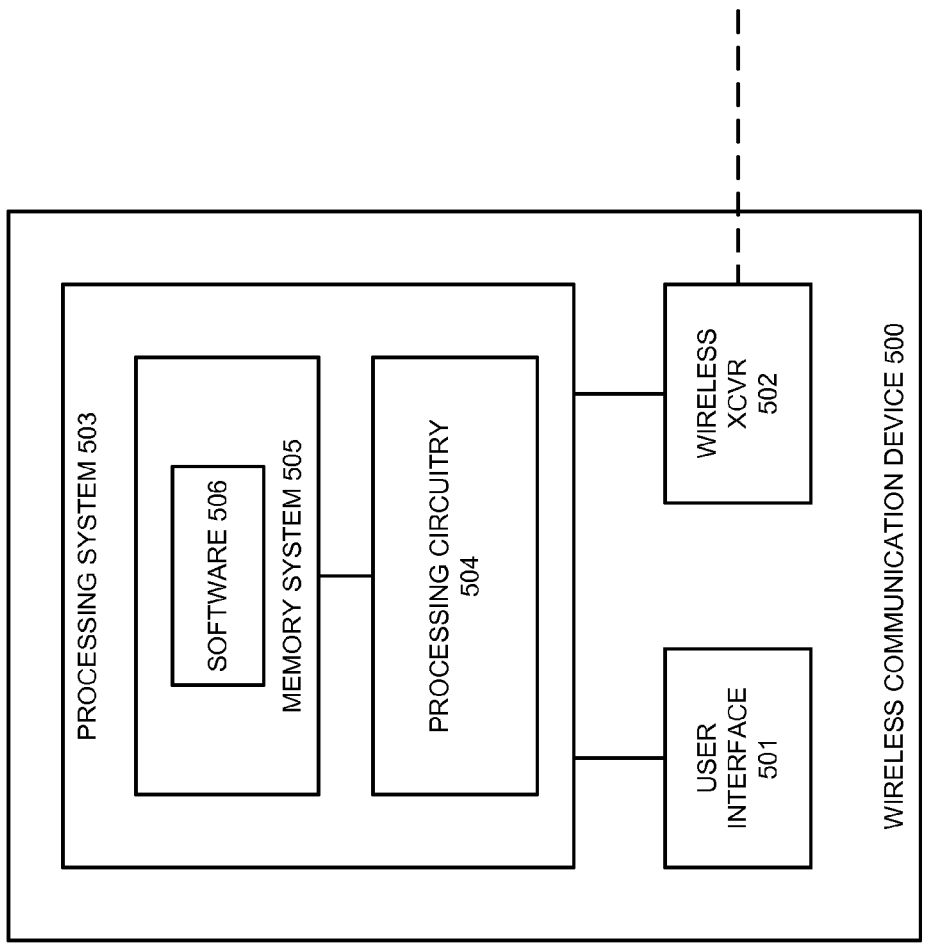
FIG. 5 illustrates a wireless communication device that integrates keep-alive messaging.

FIG. 5 illustrates wireless communication device 500 that integrates keep-alive messaging. Wireless communication device 500 is an example of wireless communication devices 101 and 601, although devices 101 and 601 may use alternative configurations. Wireless communication device 500 could be a discrete system, a distributed system, and/or could be integrated into other systems. Wireless communication device 500 comprises user interface 501, wireless transceiver 502, and processing system 503. Processing system 503 comprises processing circuitry 504 and memory system 505 that stores operating software 506. Processing system 503 is linked to user interface 501 and wireless transceiver 502. Wireless communication device 500 may include other well-known components that are not shown for clarity, such as additional communication interfaces, enclosure, camera, power supply, and the like.

User interface 501 comprises components that interact with the user. Examples of user interface 501 include a graphic display, keys, buttons, touch-pads, speaker, microphone, and the like. The user operates the user interface to launch applications and receive services as described herein.

Wireless transceiver 502 comprises an antenna, filter, amplifier, signal processing circuitry, software, and/or some other communication components. Wireless transceiver 502 may use various wireless communication formats, such as Code Division Multiple Access (CDMA), Global System for Mobile Communications (GSM), Evolution Data Only (EVDO), Worldwide Interoperability for Microwave Access (WIMAX), High Speed Packet Access (HSPA), Long Term Evolution (LTE), or some other wireless communication format—including combinations thereof. Wireless transceiver 502 transmits and receives wireless signals to integrate keep-alive messages as described herein.

Processing circuitry 504 comprises microprocessor and other circuitry that retrieves and executes operating software 506 from memory system 505. Memory system 505 comprises a computer-readable storage medium, such as a disk drive, flash drive, data storage circuitry, or some other memory apparatus. Memory system 505 could be a single device or be distributed across multiple devices. Processing circuitry 504 is typically mounted on one or more circuit boards that may also hold memory system 505 and portions of user interface 501 and wireless transceiver 502.

Operating software 506 comprises computer programs, firmware, or some other form of computer-readable processing instructions. Operating software 506 includes applications as described herein, and may also include an operating system, utilities, drivers, network interfaces, or some other type of software. When executed by processing circuitry 504, operating software 506 directs processing system 503 to operate wireless communication device 500 to detect and integrate keep-alive messaging as described herein.

Figure 6:
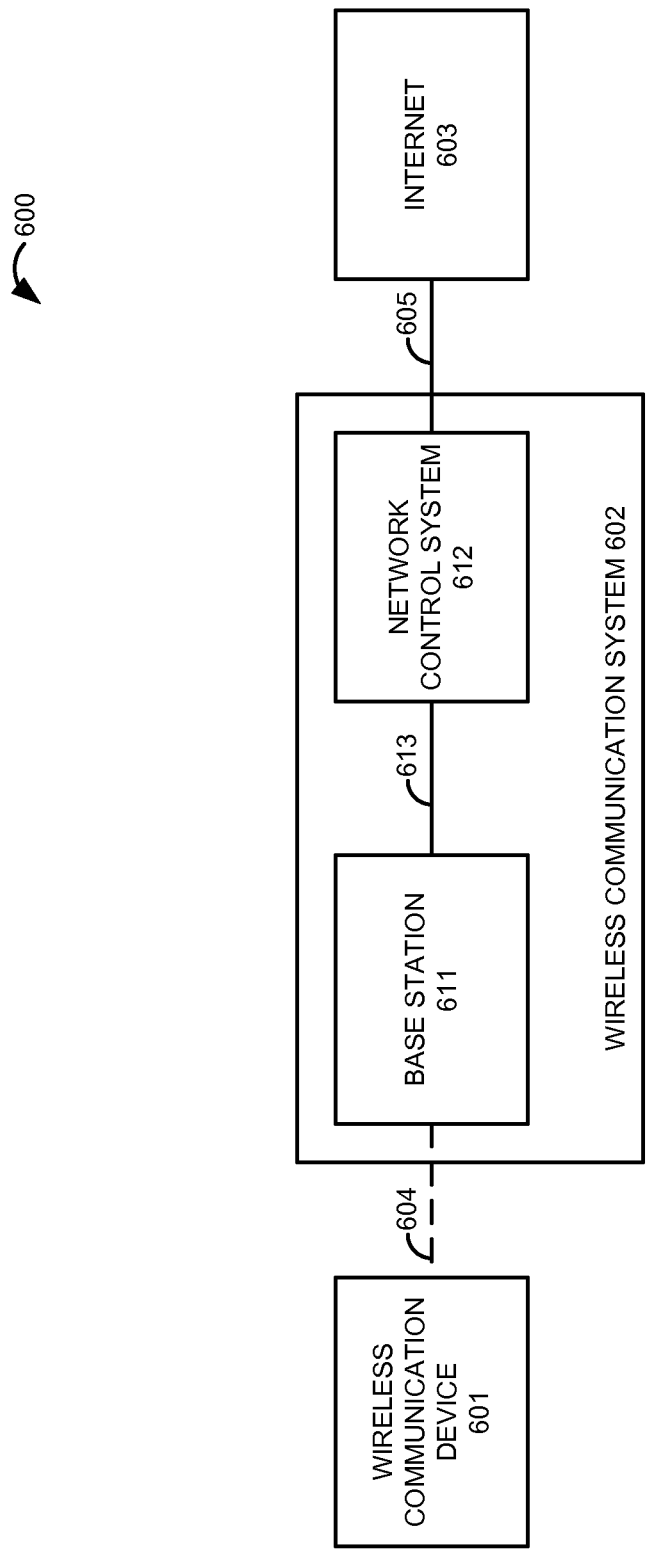
FIG. 6 illustrates a communication system that integrates keep-alive messaging.

FIG. 6 illustrates communication system 600 that integrates keep-alive messaging. Communication system 600 comprises wireless communication device 601, wireless communication system 602, and internet 603. Wireless communication system comprises base station 611 and network control system 612. Wireless communication device 601 and base station 611 communicate over wireless communication link 604. Base station 611 and network control system 612 communicate over backhaul communication link 613. Network control system 612 and internet 603 communicate over network communication link 605.

Wireless communication device 601 comprises a computer, electronic game, media player, telephone, internet appliance, wireless transceiver, or some other electronic apparatus capable of wireless communication. Wireless communication device 601 has applications that provide keep-alive messages at regular intervals to various services that operate over internet 603. If the keep-alive messages stop, then these services stop for the user.

Wireless communication device 601 processes outgoing messages to select keep-alive messages for message integration. This selection processing may entail pattern matching, deep packet inspection, address analysis, or some other technique. Wireless communication device 601 device 601 does not transfer the selected keep-alive messages, but instead, device 601 encodes keep-alive data from the selected messages into keep-alive codes. The codes identify the user, the service, and other applicable data if any. During a subsequent keep-alive transfer window, wireless communication device 601 wirelessly transfers the keep-alive codes in a single integrated keep-alive message to network control system 612 over wireless link 604, base station 611, and backhaul link 613. Another integrated keep-alive message with keep-alive codes would be sent during the next transfer window.

Network control system 612 receives the integrated keep-alive message and decodes the keep-alive codes into individual keep-alive messages with the decoded keep-alive data. For example, one of the codes may include a user ID, service ID, session ID, and password. Network control system 612 processes the service ID to generate an appropriate keep-alive message from a keep-alive message template for the service. Network control system 612 adds the user ID, session ID, and password to the keep-alive message. Network control system 612 then transfers the keep-alive message to internet 603 for subsequent delivery to the service.

In some examples, the keep-alive code for a service (or the corresponding message template) includes a message frequency. After receiving this keep-alive code in an integrated message, network control system 612 would provide keep-alive messages at the message frequency. If the next integrated message also includes the code, then network control system 612 would still provide keep-alive messages at the message frequency. If the next integrated message does not include the code, then network control system 612 would stop providing the keep-alive messages for the missing code. Thus, the ratio of integrated messages to keep-alive messages need not be one-to-one. Network control system 603 might send five keep-alive messages to a given service in between consecutive integrated keep alive messages.

Figure 7:
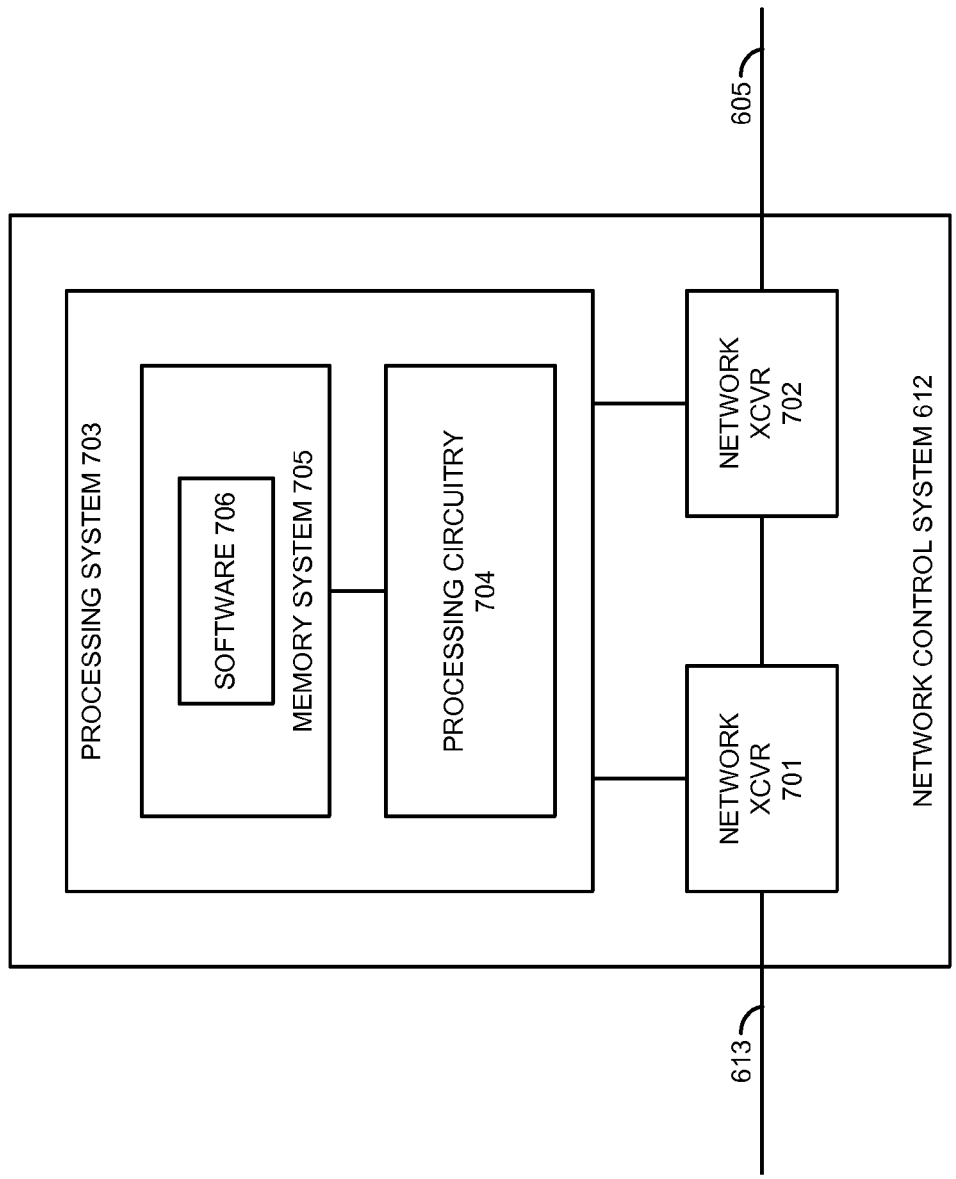
FIG. 7 illustrates a network control system that supports keep-alive message integration.

FIG. 7 illustrates network control system 612. Network control system 612 could be a discrete system, a distributed system, and/or could be integrated into other systems. For example, network control system 612 could be integrated into a radio network gateway, mobile switching system, base station controller, packet data service node, or some other network element.

Network control system 612 comprises network transceivers 701-702 and processing system 703. Processing system 703 comprises processing circuitry 704 and memory system 705 that stores operating software 706. Processing system 703 is linked to transceivers 701-702. Network control system 612 may include other well-known components that are not shown for clarity, such as additional communication interfaces, user interfaces, routers, servers, processors, power supply, and the like.

Network transceiver 701 is coupled to backhaul link 613, and network transceiver 702 is coupled to network communication link 605. Network transceivers 701-702 comprise communication ports, signal processing circuitry, software, and/or some other communication components. Network transceivers 701-702 may include an antenna and Radio Frequency (RF) circuitry if wireless communication is used. Network transceivers 701-702 may use various communication protocols, such as time division multiplex, internet, Ethernet, CDMA, wireless, or some other communication format—including combinations thereof. Network transceiver 701 receives integrated keep-alive messages over backhaul link 613. Network transceiver 702 transfers corresponding individual keep-alive messages over network link 605.

Processing circuitry 704 comprises microprocessor and other circuitry that retrieves and executes operating software 706 from memory system 705. Memory system 705 comprises a computer-readable storage medium, such as a disk drive, flash drive, data storage circuitry, or some other memory apparatus. Memory system 705 could be a single device or be distributed across multiple devices. Processing circuitry 704 is typically mounted on one or more circuit boards that may also hold memory system 705 and portions of transceivers 701-702.

Operating software 706 comprises computer programs, firmware, or some other form of computer-readable processing instructions. Operating software 706 may include an operating system, utilities, drivers, network interfaces, applications, or some other type of software. When executed by processing circuitry 704, operating software 706 directs processing system 703 to operate network control system 612 as described herein. In particular, operating software 706 directs processing system 703 to process integrated keep-alive messages having keep-alive codes to transfer individual keep-alive messages.

Referring back to FIG. 1, wireless communication device 101 comprises an antenna and RF communication circuitry for wireless communication. The RF communication circuitry typically includes an amplifier, filter, RF modulator, software, and signal processing circuitry that implement a wireless communication format. Wireless communication device 101 also includes a processing system to execute applications, direct wireless access, and perform keep-alive message integration—in addition to other tasks.

Wireless communication system 102 comprises antennas and RF communication circuitry for wireless communication. The RF communication circuitry typically includes amplifiers, filters, RF modulators, and signal processing circuitry. The signal processing circuitry implements the wireless communication format. Wireless communication system 102 also comprises processing circuitry, memory, software, and network communication interfaces. Wireless communication system 102 may also include routers, servers, call processors, computer systems, communication links, and other communication network elements.

Servers 103-104 each comprise processing circuitry, memory, software, and network communication interfaces. Servers 103-104 may also include computers, routers, servers, and other network components.

Wireless communication link 105 uses the air or space as the transport media. Wireless communication link 105 may use various protocols, such as CDMA, GSM, EVDO, WIMAX, HSPA, LTE, or some other wireless communication format—including combinations thereof. Wireless communication link 105 could be a direct link or may include intermediate networks, systems, or devices.

Network communication links 106 use metal, glass, air, space, or some other material as the transport media. Network communication links 106 may use various communication protocols, such as TDM, IP, Ethernet, wireless, or some other communication format—including combinations thereof. Network communication links 106 could comprise direct links or may include intermediate networks, systems, or devices.

The above description and associated figures teach the best mode of the invention. The following claims specify the scope of the invention. Note that some aspects of the best mode may not fall within the scope of the invention as specified by the claims. Those skilled in the art will appreciate that the features described above can be combined in various ways to form multiple variations of the invention. As a result, the invention is not limited to the specific embodiments described above, but only by the following claims and their equivalents.

What is claimed is:

1. A method of operating a wireless communication device that executes a plurality of applications that transfer keep-alive messaging, the method comprising:

receiving and storing a first keep-alive message including first keep-alive data from a first one of the applications for transfer to a first keep-alive system over a wireless communication system, the first keep-alive message comprising a first periodically transferred message to keep active a first service on the first keep-alive system associated with the first one of the applications;

processing the first keep-alive data to select the first keep-alive message for keep-alive message integration, and in response, delaying the transfer of the first keep-alive data from a first time until a keep-alive transfer window and encoding the first keep-alive data into a first keep-alive code that represents the first keep-alive data;

receiving and storing a second keep-alive message including second keep-alive data from a second one of the applications for transfer to a second keep-alive system over the wireless communication system, the second keep-alive message comprising a second periodically transferred message to keep active a second service on the second keep-alive system associated with the second one of the applications;

processing the second keep-alive data to select the second keep-alive message for the keep-alive message integration, and in response, delaying the transfer of the second keep-alive data from a second time until the keep-alive transfer window and encoding the second keep-alive data into a second keep-alive code that represents the second keep-alive data; and transferring the first keep-alive code and the second keep-alive code to the wireless communication system in a single integrated keep-alive message during the keep-alive transfer window.

2. The method of claim 1 wherein:

processing the first keep-alive data to select the first keep-alive message for the keep-alive message integration comprises comparing the first keep-alive data to set of keep-alive message signatures; and processing the second keep-alive data to select the second keep-alive message for the keep-alive message integration comprises comparing the second keep-alive data to the set of keep-alive message signatures.

3. The method of claim 1 wherein transferring the first keep-alive data and the second keep-alive data to the wireless communication system during the keep-alive transfer window comprises wirelessly transferring the first keep-alive message and the second keep-alive message to the wireless communication system during the keep-alive transfer window.

4. The method of claim 1 wherein transferring the first keep-alive data and the second keep-alive data to the wireless communication system in the single integrated keep-alive message during the keep-alive transfer window comprises wirelessly transferring the first keep-alive data and the second keep-alive data in the single integrated keep-alive message to the wireless communication system during the keep-alive transfer window.

5. The method of claim 1 wherein the first keep-alive code represents the first keep-alive system and the first application and the second keep-alive code represents the second keep-alive system and the second application.

6. A wireless communication system comprising:

a wireless communication device configured to receive a first keep-alive message including first keep-alive data from a first application for transfer to a first keep-alive system, the first keep-alive message comprising a first periodically transferred message to keep active a first service on the first keep-alive system associated with the first application, process the first keep-alive data to select the first keep-alive message for keep-alive message integration, and in response, delay the transfer of the first keep-alive data until a keep-alive transfer window and encode the first keep-alive data into a first keep-alive code that represents the first keep-alive data;

the wireless communication device configured to receive a second keep-alive message including second keep-alive data from a second application for transfer to a second keep-alive system, the second keep-alive message comprising a second periodically transferred message to keep active a second service on the second keep-alive system associated with the second application, process the second keep-alive data to select the second keep-alive message for the keep-alive message integration, and in response, delay the transfer of the second keep-alive data until the keep-alive transfer window and encode the second keep-alive data into a second keep-alive code that represents the second keep-alive data; and the wireless communication device configured to wirelessly transfer the first keep-alive code and the second keep-alive code in a single integrated keep-alive message during the keep-alive transfer window;

the wireless communication system configured to wirelessly receive the first keep-alive code and the second keep-alive code in the single integrated keep-alive message, and in response, decode the first keep-alive code to generate the first keep-alive data and decode the second keep-alive code to generate second keep-alive data; and the wireless communication system configured to transfer the first keep-alive message having the first keep-alive data for delivery to the first keep-alive system and transfer the second keep-alive message having the second keep-alive data for delivery to the second keep-alive system.

7. The wireless communication system of claim 6 wherein the wireless communication device is configured to compare the first keep-alive data to set of keep-alive messaging signatures to select the first keep-alive message for the keep-alive message integration and to compare the second keep-alive data to the set of keep-alive messaging signatures to select the second keep-alive message for the keep-alive message integration.

8. The wireless communication system of claim 6 wherein:
the wireless communication device is configured to wirelessly transfer the first keep-alive message with the first keep-alive data and the second keep-alive message with the second keep-alive data during the keep-alive transfer window; and the wireless communication system is configured to wirelessly receive the first keep-alive message with the first keep-alive data and the second keep-alive message with the second keep-alive data.

9. The wireless communication system of claim 6 wherein:
the wireless communication device is configured to wirelessly transfer the first keep-alive data and the second keep-alive data in the single integrated keep-alive message during the keep-alive transfer window; and the wireless communication system is configured to wirelessly receive the single integrated keep-alive message with the first keep-alive data and the second keep-alive data.

10. The wireless communication system of claim 6 wherein the first keep-alive code represents the first keep-alive system and the first application and the second keep-alive code represents the second keep-alive system and the second application.

11. The wireless communication system of claim 6 wherein the first keep-alive code represents the first keep-alive system and the first application and the second keep-alive code represents the second keep-alive system and the second application.

12. The wireless communication system of claim 6 wherein:
the wireless communication system is configured to wirelessly transfer keep-alive detection and encoding data; and the wireless communication device is configured to wirelessly receive the keep-alive detection and encoding data.

13. The wireless communication system of claim 12 wherein the keep-alive detection and encoding data includes a set of keep-alive messaging signatures and the wireless communication device is configured to compare the first keep-alive data to the set of keep-alive messaging signatures to select the first keep-alive message for the keep-alive message integration and compare the second keep-alive data to the set of keep-alive messaging signatures to select the second keep-alive message for the keep-alive message integration.

* * * * *